US012060442B2

(12) United States Patent
Westbye

(10) Patent No.: US 12,060,442 B2
(45) Date of Patent: Aug. 13, 2024

(54) USE OF ETHOXYLATED FATTY AMIDO ALCOHOLS AS A REACTIVITY ADDITIVE IN THE PROCESS WHEREIN CELLULOSE IS REACTED WITH LYE

(71) Applicant: NOURYON CHEMICALS INTERNATIONAL B.V., Arnhem (NL)

(72) Inventor: Peter Westbye, Stenungsund (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 307 days.

(21) Appl. No.: 17/278,019

(22) PCT Filed: Sep. 23, 2019

(86) PCT No.: PCT/EP2019/075473
§ 371 (c)(1),
(2) Date: Mar. 19, 2021

(87) PCT Pub. No.: WO2020/058524
PCT Pub. Date: Mar. 26, 2020

(65) Prior Publication Data
US 2021/0347917 A1 Nov. 11, 2021

(30) Foreign Application Priority Data
Sep. 21, 2018 (EP) .................................... 18196062

(51) Int. Cl.
*C08B 9/00* (2006.01)
*C08B 1/08* (2006.01)
*C08L 1/02* (2006.01)
(52) U.S. Cl.
CPC .................. *C08B 9/00* (2013.01); *C08B 1/08* (2013.01); *C08L 1/02* (2013.01)
(58) Field of Classification Search
CPC ...................................... C08B 9/00; C08L 1/02
See application file for complete search history.

(56) References Cited

U.S. PATENT DOCUMENTS

| 2,664,360 A | 12/1953 | Charles et al. |
| 2,858,304 A | 10/1958 | Bradshaw et al. |
| 3,508,942 A | 4/1970 | Horst |
| 5,080,811 A | 1/1992 | Brueckmann et al. |
| 2009/0321025 A1 | 12/2009 | Weightman et al. |

FOREIGN PATENT DOCUMENTS

| EP | 0079766 A2 | 5/1983 |
| GB | 792548 A | 3/1958 |
| GB | 905149 A | 2/1961 |
| GB | 965948 A | 3/1962 |
| GB | 1271118 A | 4/1972 |

OTHER PUBLICATIONS

EPO, European Search Report issued in EP Application No. 18196062. 6, dated Jan. 18, 2019.
EPO, International Search Report issued in International Application No. PCT/EP2019/075473, dated Nov. 11, 2019.
Lic, A., et al. "Nonionic Surfactants Containing an Amide Group", Surfactant Science Series, 1998, pp. 177-185, vol. 72, Marcel Dekker NY.

*Primary Examiner* — Leigh C Maier
(74) *Attorney, Agent, or Firm* — LORENZ & KOPF, LLP

(57) ABSTRACT

The present disclosure relates to the use of alkoxylated fatty amido alcohols in the process to make viscose wherein cellulose is reacted with lye and the lye strength is from about 8 to about 20% by weight of NaOH, based on the weight of water in the reaction mixture. The use as a reaction improvement additive improves the reaction rate between the cellulose and the lye. The use also improves the reaction between alkali-cellulose and $CS_2$. The present disclosure also relates to solid cellulose that is treated with one or more ethoxylated fatty amido alcohols and which is suitable for use in the claimed process.

15 Claims, No Drawings

US 12,060,442 B2

USE OF ETHOXYLATED FATTY AMIDO ALCOHOLS AS A REACTIVITY ADDITIVE IN THE PROCESS WHEREIN CELLULOSE IS REACTED WITH LYE

CROSS-REFERENCE TO RELATED APPLICATION

This application is a U.S. National-Stage entry under 35 U.S.C. § 371 based on International Application No. PCT/EP2019/075473, filed Sep. 23, 2019, which was published under PCT Article 21(2) and which claims priority to European Application No. 18196062.6, filed Sep. 21, 2018, which are all hereby incorporated in their entirety by reference.

FIELD OF THE DISCLOSURE

The process to make viscose, also known as the cellulose xanthate process, is known since 1891. It involves the reaction of a lye, typically a concentrated NaOH solution, with the cellulose raw material, a process often called "steeping". The alkali-treated cellulose is reacted with $CS_2$ in the xanthation step to make a viscose solution, which can be spun into fibers. Reactivity additives are often used in the steeping process to speed up the reaction of NaOH with cellulose pulp, without influencing the xanthation process and the resulting fibre properties negatively. Suitably, the reactivity additives do not adversely affect the efficiency in the xanthation step, or any of the other processing steps to make the fibres, such as ripening, washing, filtration, and deaeration, and without leading to any hornification, being the irreversible collapse of unreacted cellulose fibers onto each other.

Background In the process to make viscose, various surface active agents have been proposed and used over the years, most being glycol ethoxylates, but other compounds have been suggested as well. For example, U.S. Pat. No. 2,858,304 discloses the use of various emulsifiers in a process wherein an oxygenated gas is used to age an alkali-cellulose slurry. U.S. Pat. No. 2,664,360 is disclosing the use of additives with a high molecular weight because of the longer hydrophobic alkyl chains and the highly degree of ethoxylation these product need for being emulsifiers. Such products were found to be less efficient. U.S. Pat. No. 3,508,942 relates to additives leading to white viscose. However it is not taught to use additives in the reaction with lye to increase the reactivity. GB 792548 discloses a process wherein the additive is used in combination with a very low lye concentration of 6%. This process is inefficient, because the additive and the lye are fully in solution. GB 965948 and PL882875170 teach the use emulsifiers in the spinning bath or viscose to improve the spinning process. Similarly, GB 905149 teaches to use amido amines to prevent incrustation of spinnerets.

However, the use of surfactants in the viscose process can give all kinds of problems, as presented, for instance, in GB 1271118, wherein it is suggested to only use specific surfactants to allow the use of low-resin cellulose. These surfactants are also said to have a positive influence on the reactivity of the pulp. US2009/0321025 suggests to use hydrophilic polymers that are soluble in the lye to prevent collapse, e.g. in a subsequent pressing step, due to the removal of hemicellulose. For many of the surfactant thus far proposed it was also found that they lead to problems in the xanthation reaction resulting in a xanthate solution that still comprises cellulose that is not reacted with $CS_2$, typically referred to as xanthate with a high clogging value.

Presently various reactivity additives are in commercial use. One commercial reactivity agent is Berol® Visco 388 ex AkzoNobel which comprises a polyoxy ethylene glycol derivative.

However, viscose producers still have an interest to improve the viscose process. More specifically, there is a need for a reactivity agent with even better cellulose-swelling properties and/leading to further improvements in the xanthation step, i.e. leading to less clogging.

It is further noted that impurities in the cellulose, particularly extractives, have been known to facilitate the reaction of NaOH with cellulose and the subsequent reaction with $CS_2$. However these impurities adversely affect the quality of the resulting viscose fibre and adversely influences the viscose spinning process as the fibres become more uneven and have more deficiencies, leading to more frequent upsets in the spinning process, such as cleaning of the spinnerets. For this reason many viscose processes require the use of cellulose with a low level of impurities, more particularly a cellulose with a level of extractives=<0.25% by weight and an ash content=<0.1% by weight.

There is a long-felt need to improvement the viscose process, particularly to increase the reaction rate of the cellulose and lye, allowing a good reactivity with $CS_2$, preferably for cellulose containing a low level of impurities, leading to better economics, whereby chemicals are used that have a good environmental and toxicity profile to avoid problems in waste water treatment installations. In addition, other objects, desirable features and characteristics will become apparent from the subsequent summary and detailed description, and the appended claims, taken in conjunction with this background.

SUMMARY

The present disclosure relates to a process to treat cellulose with a reactivity additive for increasing the reactivity between cellulose and lye, preferably in the process to make viscose. It was found that specific ethoxylated fatty amido alcohols improve the reactivity rate of cellulose and lye, whereby the lye strength is equal to an aqueous solution of from about 8 to about 20% w/w of NaOH, and therefore can be used as reactivity additive. The exact mechanism is not understood but it appears that the use of these surfactants improve the accessibility of underlying cellulose molecules when the cellulose is reacted with lye.

In another embodiment, the present disclosure relates to the use of ethoxylated fatty amido alcohols to improve the reaction of alkali-cellulose with $CS_2$, preferably in the process to make viscose.

Yet another embodiment relates to a solid cellulose that is treated with ethoxylated fatty amido alcohols and which is suitable for use, as a raw material, in the aforementioned process.

In one embodiment, the disclosure provides a process wherein about 0.005 to about 2.0% by weight of an alkoxylated fatty amido alcohol is added to a cellulose pulp during or, preferably, before reacting the cellulose with a lye, whereby the lye strength is from about 8 to about −20% by weight of NaOH, based on the weight of water in the reaction mixture, and the weight of the alkoxylated fatty amido alcohol is based on the weight of the cellulose, whereby about 80% or more, on a molar basis, of the alkoxy groups are ethoxy.

Accordingly, the present disclosure relates to a process wherein cellulose is reacted with lye in the presence of ethoxylated fatty amido alcohols as mentioned in the claims.

The present disclosure further relate to the use of cellulose which is pre-treated with the ethoxylated fatty amido alcohols as mentioned in the claims. The pre-treated cellulose is easily used in the viscose process, for instance by mixing the pre-treated cellulose with a lye-containing solution. The pretreated solid cellulose can be used in the form of rolls, sheets in other dried forms. Where cellulose rolls or cellulose sheets are used, they are suitably treated with the ethoxylated fatty amido alcohols of the present disclosure prior to, or during, rolling or stacking of the sheets. Suitably the reactivity additive is brought in contact with the cellulose before the last drying step in the pulp mill. In an embodiment the ethoxylated fatty amido alcohol is contacted with a cellulose pulp containing from about 10 to about 70 or from about 30 to about 60 percent by weight of water.

Optionally the cellulose, pre-treated or not, is cut or ground before use in the viscose process.

If cellulose is used in the viscose process that is not pre-treated, then suitably the treatment of the cellulose with the reactivity additive is performed in the viscose plant wherein said cellulose is a feedstock. In such a case also never-dried cellulose can be used as a raw material. Irrespective where the cellulose is treated, any type of treatment, such as dipping, rolling, spraying, and the like, is possible as long as the reactivity additive is brought in contact with the cellulose. Typically the ethoxylated fatty amido alcohols are applied (usually by spraying a dispersion or solution of the ethoxylated fatty amido alcohols) on one side of the cellulose surface before or during rolling or stacking the sheet material. If this is done, the treated cellulose is typically shipped from the pulp mill to the viscose plant. However, it is also possible to treat the cellulose with the reactivity additive when unrolling or unstacking the cellulose or at an even later stage in the processing of the cellulose, up to the point wherein the cellulose is contacted with lye.

In an embodiment the present disclosure relates to a process wherein an alkali-cellulose is reacted with $CS_2$ in the presence ethoxylated fatty amido alcohols as mentioned in the claims.

Also a combination of treatments can be used wherein both a pre-treated cellulose is used but wherein additional reactivity agent is added in the process where lye is added to the (alkali)cellulose-containing stream. This has benefits for quality control, particularly when the cellulose source is not constant. In an embodiment, at least part of the reactivity additive is added in the step wherein cellulose is reacted with lye.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

The present disclosure relates to the use of ethoxylated fatty amido alcohols in the process to make viscose. In one embodiment the present disclosure relates to the use of ethoxylated fatty amido alcohols as a reaction improvement additive for the reaction between cellulose and a lye. In one embodiment the present disclosure relates to the use of ethoxylated fatty amido alcohols as a reaction improvement additive for making alkali-cellulose that subsequently can be reacted with and $CS_2$, whereby the xanthated product has an improved (lower) clogging value. Another embodiment relates to cellulose that is treated with one or more ethoxylated fatty amido alcohols which is suitable for reaction with lye, preferably in the process to make viscose.

The ethoxylated fatty amido alcohols of the present disclosure are suitably produced by first reacting a fatty acid or its ester, typically an ester with a C1-6 alcohol, with ethanolamine or diethanolamine to form a product of the formula alkyl-CONH—$C_2H_4$OH, which is subsequently reacted with ethylene oxide. The process is discussed in in A. Lif and M. Hellsten, Nonionic Surfactants Containing an Amide Group, in Surfactant Science Series, Vol. 72, Marcel Dekker NY, 1998, pp 177-185. Typically the reaction of acid (ester) and ethanolamine is optimized to maximize the amount of fatty alkanol amide glycol ether, for instance by employing dosing the ethanolamine to the fatty acid under reaction conditions.

Suitable fatty acids are those acids with from about 8 to 24 carbon atoms per acid moiety. In the disclosure, suitably a fatty acid is used with, on average, from about 8, about 9, or about 10 up to about 24, about 22, about 20, about 18, or about 14 carbon atoms per carboxylic acid moiety. In an embodiment it is the residue of coco fatty acid which is the fatty acid from coconut oil and is a mixture of various fatty acids, predominantly about C8-C18 fatty acids, with the majority being about C12-C14 fatty acid, i.e. lauric and myristic acid. The fatty acids are mostly saturated but some unsaturated fatty acids, such as oleic acid, may be present. In an embodiment the alkyl moiety of the formula comprises more than about 50% by weight of about C11-C13 alkyl groups.

In the ethoxylation step, 1 mole of alkyl-CONH—$C_2H_4$OH, alkyl-CON—$(C_2H_4OH)_2$, or a mixture thereof, is reacted with x moles of ethylene oxide wherein x is the, average, degree of ethoxylation and wherein alkyl-CO is the residue of a fatty carboxylic acid, as described above. In one embodiment x is at least about 2, about 3, about 4, or about 5 with a maximum of about 15, about 14, about 13 or about 12. In an embodiment x is greater than about 5. In another embodiment x is in the range of from about 5 to about 9. In an embodiment x is from about 5 to about 12 with alkyl-CO, on average, having a total of carbon numbers up to about 14.

It is noted that instead of about 100% ethylene oxide, the ethoxylation can also be performed with mixtures of ethylene oxide, propylene oxide, and/or butylene oxide. Also the reaction can be with ethylene oxide, propylene oxide, and/or butylene oxide in separate steps to form a product with a somewhat blocky alkoxylation. All of these products can be represented by products of the formulae alkyl-CONH—$C_2H_4$O-$(AO)_x$—H and alkyl-CON—$(C_2H_4O\text{-}(AO)_{x/2}$—H$)_2$, whereby AO stands for alkyloxide. Suitably the mixtures of oxides comprise, on a molar basis, at least about 80% ethylene oxide. The resulting products are herein all labeled as ethoxylated fatty amido alcohols.

In an embodiment these ethoxylated fatty amido alcohols are used in the process to make viscose. They were found to improve the reaction rate of both the reaction of cellulose with lye and the reaction of alkali-cellulose with $CS_2$, without adverse affecting the resulting viscose or the spinning process. Hence the products are herein also referred to as reactivity agents.

Without being bound by this theory, it is believed that the reactivity agent is partly precipitating on the cellulose surface when a concentrated lye solution (such as a from about 15 to about 20%, typically about 18% w/w NaOH solution in water) is added to an aqueous medium comprising amide and cellulose. The presence of the reactivity on the surface of the cellulose then makes the OH groups of the cellulose more readily available for reaction with the lye, and subsequently with $CS_2$. However, the reactivity agent goes back in solution when the lye becomes less concentrated, so that it can be washed away after the cellulose is reacted with $CS_2$, and therefore the spinning process to make viscose fibre is not disturbed. However, the actual mode of action of the (precipitated) reactivity additive in combination with the lye strength as claimed is also unknown. Speculations have it that the additive reduced cellulose crystallization and serves as a swelling enhancer, also for alkali-cellulose to make the reactive sites more easily accessible for the $CS_2$, and/or a phase transfer catalyst.

Suitably the amount of reactivity agent used in the process is from about 0.005, about 0.01, about 0.015, about 0.02, about 0.05, or about 0.1 up to about 2.0, about 1.5, about 1.0, about 0.5 or about 0.2% by weight, based on the weight of the cellulose.

The lye which is reacted with the cellulose is aqueous and usually a NaOH solution, but other alkaline agents, including KOH, can be used. The concentration of the lye can be kept constant or it can be allowed to lower in the course of the reaction with the cellulose or the reaction can be in multiple steps where the concentration of the lye is varied. Suitably the lye strength is equal to a solution of from about 8 to about 20% w/w of NaOH. In an embodiment in one step the lye strength is equal to a solution of from about 8 to about 14% w/w NaOH during at least part of the alkalization. In another embodiment the lye concentration is strength is equal to a solution of about 16 or about 17 up to about 19 or about 20% w/w NaOH during at least part of the alkalization. In an embodiment the lye strength is equal to a solution of about 16 or about 17 up to about 19 or about 20% w/w NaOH in a first step and equal to a solution of about 4 or about 5 up to about 10 or about 14% w/w NaOH in a second step of the alkalization process. At those concentrations the lye is typically not fully dissolved in the reaction mixture. According to the unproven theory it is the combination of lye strength and reactivity additive that makes the mercerization process of the present disclosure so effective.

The reaction temperature can be from ambient or about 15° C. up to about 60° C., depending on desired reaction rates and whether or not controlled degradation (ageing) of the cellulose is desired. Suitably the reaction with lye is performed at a temperature between about 35° C. and about 50° C. Typical reaction times, depending on temperature and concentration are from about 1 to about 3 hours, suitably about 1 hour.

The alkali-cellulose is reacted with $CS_2$ in a conventional way. Suitable the reacting mass contains from about 25 to about 35% w/w $CS_2$, based on the weight of the cellulose. Suitably the reaction with $CS_2$ is performed at a temperature between about 15° C. and about 60° C. Also a reaction temperature between about 20 and about 35° C. has been reported. Suitably the reaction time is from about 30 minutes to about 4 hours, typically about 2 hours. $CS_2$ can be added all at once, in portions, continuous for a certain time period, or combinations thereof.

In an embodiment the temperature during alkalization and the reaction with $CS_2$ (xanthation) is at about the same temperature (a difference of less than about 10° C. In an embodiment part of the alkalization is carried out simultaneous with the xanthation reaction.

The xanthate showed good filterability and very little gel-like particles, so good clogging value, allowing good processing in the spinning process and good viscose fibre quality. Typically the regenerated cellulose fiber is suitably washed, to remove ethoxylated fatty amido alcohol.

When a ratio or amount is given, it is by weight, unless mentioned differently.

An increase of a parameter is considered to be absent if the numerical value of the relevant property is not increased or increased with less than about 10%.

The present disclosure will now be illustrated by the following non-limiting examples. Throughout this document, unless indicated differently, the weight percentages of the compositions are based on the total weight of the composition, whereby the total weight of the composition is about 100 wt %. The term water-soluble is used for materials that dissolve in an amount of at least about 1 g per liter of demineralized water at about 25° C. Where used, the term "consisting" also embraces "consisting substantially", but may optionally be limited to its strict meaning of "consisting entirely".

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Where upper and lower limits are quoted for a property, for example for the concentration of a component, then a range of values defined by a combination of any of the upper limits with any of the lower limits may also be implied.

It will also be appreciated that features from different aspects and embodiments of the present disclosure may be combined with features from any other aspect and embodiment of the present disclosure.

Although the present disclosure is illustrated and described herein with reference to specific embodiments, the present disclosure is not intended to be limited to the details shown. Rather, various modifications may be made in the details within the scope and range of equivalents of the claims.

Examples

In order to study the effect of a reactivity additive on the reaction between lye and cellulose the following method is used.

A reactivity additive stock solution with a concentration of 1% stock solution was prepared for accuracy.

Sheets of cellulose from the pulp mill were cut into 10 small circles with a diameter of 32.5 mm using a hammer and a punch. It is of great importance that they are perfectly circular with clear cut edges and that there is no contamination on the pulp. The 10 circles were then placed on a scale, the weight was recorded, and they were then placed horizontally inside a 250-ml measuring cylinder with an inner diameter of 34 mm, and the initial height of the sum of the stacked cellulose discs was recorded.

Into the cylinder enough of the additive stock solution was added to achieve a dosage of 0.2% by weight of the reactivity additive based on the weight of the cellulose (which amounts to 2 kg/ton). After 5 minutes (conditioning) the height of the stack of cellulose discs was recorded.

Subsequently 201.3 g of a NaOH solution with a concentration of 19.7% w/w (to reach a final concentration of 18 w/w % NaOH) was added to the cylinder. The height was recorded after 1, 2, and 10 minutes. If one or more of the cellulose discs starts to float, then a glass rod (weighing 11 grams) was carefully lowered on the floating cellulose discs and, using its own weight, used to carefully press down the pulp circles to allow for accurate measurements of the height of the pillar of swollen cellulose discs. Each analysis was done in triplicate.

Materials:

Water was demineralized water

Berol® Visco 388, a conventional reactivity additive based on polyoxy ethylene glycol, was supplied by AkzoNobel Coco monoethanolamide ethoxylated with 2, 5, 8, 12, or 15 EO molecules per mole was produced in a conventional way by reacting coco methyl ester with monoethanolamine. The reaction product (fatty alkanol amide glycol ether) was purified before reacting it with the indicated from about 2-15 moles of EO per mole of the ether. The resulting product was washed and dried.

Coco diethanolamide ethoxylated with, on average, 8 and 12 EO molecules per mole was produced in a conventional way by reacting coco methyl ester with diethanolamine. The reaction product (fatty alkanol amide glycol ether) was purified before reacting it with 8 or 12 moles of EO per mole of the ether. The ethoxylated fatty amido alcohol was sprayed as a 1.3% solution in water onto a cellulose pulp sheet, where after the treated sheet was dried for 48 hours at ambient temperature. These sheets were processed as indicated above.

Results: The table shows the swelling over time of the pulp circles as measured in millimeters with the standard deviation from the three trials noted.

| Additive 0.2 % w/w | Height of pulp pillar (mm) over a total time (minutes) of | | | | |
|---|---|---|---|---|---|
| | 0 | 5 | 6 | 7 | 15 |
| Only Water (reference) | 15 | 22 | 50 ± 2 | 61 ± 4 | 96 ± 3 |
| Berol Visco 388 (reference) | 15 | 22 | 62 ± 2 | 70 ± 3 | 105 ± 2 |
| Coco monoethanolamide with 2 moles of EO | 15 | 23 | 64 ± 2 | 72 ± 2 | 104 ± 3 |
| Coco monoethanolamide with 5 moles of EO | 15 | 21 | 67 ± 2 | 75 ± 3 | 111 ± 2 |
| Coco monoethanolamide with 8 moles of EO | 15 | 22 | 69 ± 3 | 77 ± 3 | 117 ± 3 |
| Coco monoethanolamide with 12 moles of EO | 15 | 22 | 68 ± 3 | 77 ± 4 | 112 ± 4 |
| Coco monoethanolamide with 15 moles of EO | 15 | 21 | 64 ± 2 | 71 ± 2 | 107 ± 3 |
| Coco diethanolamide with 8 moles of EO | 15 | 20 | 69 ± 3 | 79 ± 5 | 120 ± 5 |
| Coco diethanolamide with 12 moles of EO | 15 | 22 | 68 ± 2 | 78 ± 3 | 114 ± 4 |

The better swelling gave better accessibility of the OH groups of the cellulose and therefore led to a more efficient alkalization in the process to make viscose.

The resulting alkalicellulose was found to react with $CS_2$ in a complete manner at 28° C. for 1.5 hours, leading to very little unreacted (alkali)cellulose in the xanthated product. This was analysed for by dissolving 8.5 weight % of xanthate in an aqueous 6% NaOH solution for 2 hours at 10° C., followed by ripening for 24 hours at 20° C. of the viscose and how much filtrate flows from a filter holding said unfiltered solution at 20° C., after pressurization with 2 bars, during the first 20 minutes (a) and the next 40 minutes (b). The clogging value Kw is then proportionate with (2−b/a)/(a+b) with a lower value being preferred.

| Additive 0.2 % ww | Clogging Kw |
|---|---|
| Only Water (reference) | 2570 |
| Berol Visco 388 (reference) | 1920 |
| Coco monoethanolamide with 8 moles of EO | 1403 |

The results show the improved quality of the xanthated product/viscose when a reactivity agent is used to facilitate the reaction of cellulose and lye under conditions as claimed. The data further shows that the reactivity agent facilitates the reaction of alkali cellulose and $CS_2$ leading to a favorable cellulose xanthate.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Process wherein about 0.005 to about 2.0% by weight of an alkoxylated fatty amido alcohol is added to a cellulose pulp during or before reacting the cellulose with a lye, whereby the lye strength is from about 8 to about 20% by weight of NaOH, based on the weight of water in the reaction mixture, and the weight of the alkoxylated fatty amido alcohol is based on the weight of the cellulose, wherein the alkoxylated fatty amido alcohol is chosen from coco monoethanolamide ethoxylated with from about 5 to about 15 moles of ethylene oxide, coco diethanolamide ethoxylated with from about 5 to about 15 moles of ethylene oxide, and combinations thereof.

2. A solid cellulose composition comprising cellulose and from about 0.005 to about 2.0% by weight of an alkoxylated fatty amido alcohol, based on the weight of the cellulose wherein the alkoxylated fatty amido alcohol is coco diethanolamide ethoxylated with from about 5 to about 15 moles of ethylene oxide.

3. Process of claim 1 wherein the alkoxylated fatty amido alcohol is coco monoethanolamide ethoxylated with 5 to 12 moles of ethylene oxide.

4. Process of claim 1 wherein the alkoxylated fatty amido alcohol is coco monoethanolamide ethoxylated with 8 to 12 moles of ethylene oxide.

5. Process of claim 1 wherein the alkoxylated fatty amido alcohol is coco monoethanolamide ethoxylated with 12 to 15 moles of ethylene oxide.

6. Process of claim 1 wherein the alkoxylated fatty amido alcohol is coco monoethanolamide ethoxylated with 8 to 15 moles of ethylene oxide.

7. Process of claim 1 wherein the alkoxylated fatty amido alcohol is coco diethanolamide ethoxylated with from about 8 to about 12 moles of ethylene oxide.

8. Process of claim 1 wherein the alkoxylated fatty amido alcohol is coco diethanolamide ethoxylated with 8 to 15 moles of ethylene oxide.

9. Process of claim 1 wherein the alkoxylated fatty amido alcohol is coco diethanolamide ethoxylated with 5 to 12 moles of ethylene oxide.

10. Process of claim 1 wherein the alkoxylated fatty amido alcohol is a coco diethanolamide that is ethoxylated with about 12 to 15 moles of ethylene oxide.

11. Process of claim 1 wherein the alkoxylated fatty amido alcohol is coco monoethanolamide ethoxylated with from 5 to 15 moles of ethylene oxide.

12. Process of claim 1 wherein the alkoxylated fatty amido alcohol is coco diethanolamide ethoxylated with from 5 to 15 moles of ethylene oxide.

13. The solid cellulose composition of claim 2 wherein the alkoxylated fatty amido alcohol is coco diethanolamide ethoxylated with from 5 to 12 moles of ethylene oxide.

14. The solid cellulose composition of claim 2 wherein the alkoxylated fatty amido alcohol is coco diethanolamide ethoxylated with from 8 to 15 moles of ethylene oxide.

15. The solid cellulose composition of claim 2 wherein the alkoxylated fatty amido alcohol is coco diethanolamide ethoxylated with from 8 to 12 moles of ethylene oxide.

\* \* \* \* \*